US010947704B2

(12) United States Patent
Bjerke

(10) Patent No.: US 10,947,704 B2
(45) Date of Patent: Mar. 16, 2021

(54) BOLT RETENTION ASSEMBLY FOR A WORK TOOL

(71) Applicant: Caterpillar Inc., Deerfield, IL (US)

(72) Inventor: Nathan R. Bjerke, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 109 days.

(21) Appl. No.: 16/196,364

(22) Filed: Nov. 20, 2018

(65) Prior Publication Data

US 2020/0157782 A1 May 21, 2020

(51) Int. Cl.
*E02F 9/28* (2006.01)
*F16B 31/04* (2006.01)

(52) U.S. Cl.
CPC .......... *E02F 9/2833* (2013.01); *E02F 9/2825* (2013.01); *F16B 31/04* (2013.01)

(58) Field of Classification Search
CPC ........ E02F 9/2833; E02F 9/2825; F16B 31/04
See application file for complete search history.

(56) References Cited

U.S. PATENT DOCUMENTS

| 5,778,599 | A | 7/1998 | Saito | |
|---|---|---|---|---|
| 6,240,663 | B1* | 6/2001 | Robinson | E02F 9/2825 37/455 |
| 7,219,454 | B2* | 5/2007 | Maher | E02F 9/2833 172/753 |
| 8,707,590 | B2 | 4/2014 | Hughes | |
| 9,371,631 | B2 | 6/2016 | Karlsson et al. | |
| 9,540,796 | B2 | 1/2017 | Dallard et al. | |
| 9,909,285 | B2 | 3/2018 | Bjerke et al. | |
| 9,938,695 | B2 | 4/2018 | Bjerke et al. | |
| 2008/0005940 | A1* | 1/2008 | Ollinger | E02F 9/2825 37/452 |
| 2009/0304442 | A1 | 12/2009 | Dennis et al. | |
| 2013/0212916 | A1* | 8/2013 | Stangeland | B28D 1/188 37/446 |
| 2014/0173949 | A1* | 6/2014 | Karlsson | E02F 9/2833 37/455 |
| 2014/0202049 | A1* | 7/2014 | Ruvang | E02F 9/2883 37/453 |
| 2014/0360061 | A1* | 12/2014 | Kunz | E02F 9/2883 37/455 |

(Continued)

FOREIGN PATENT DOCUMENTS

| AU | 2003204374 | 12/2003 |
|---|---|---|
| AU | 2011221349 | 4/2015 |

(Continued)

*Primary Examiner* — Jessica H Lutz
(74) *Attorney, Agent, or Firm* — Law Office of Kurt J. Fugman LLC

(57) ABSTRACT

A bolt retention assembly defines a horizontal direction, a vertical direction, and a lateral direction that is perpendicular to the vertical direction and the horizontal direction. The bolt retention assembly includes an adapter including a forward abutment portion and a rearward horizontally oriented saddle portion. The adapter may also define an interior aperture. The bolt retention assembly further includes a slide including a forward threaded portion configured to fit within the interior aperture of the adapter, and a rearward vertically oriented cradle portion configured to receive the rearward horizontally oriented saddle portion of the adapter.

18 Claims, 10 Drawing Sheets

(56) References Cited

U.S. PATENT DOCUMENTS

| | | | |
|---|---|---|---|
| 2015/0211214 A1* | 7/2015 | Dallard | E02F 9/2841 37/456 |
| 2017/0022690 A1* | 1/2017 | Tasovski | E02F 9/2841 |
| 2017/0073938 A1* | 3/2017 | Bjerke | E02F 9/2841 |
| 2017/0073939 A1* | 3/2017 | Bjerke | E02F 9/2825 |
| 2017/0370076 A1* | 12/2017 | Campomanes | E02F 9/2833 |
| 2018/0044895 A1* | 2/2018 | Rol Corredor | E02F 9/2833 |
| 2020/0095752 A1* | 3/2020 | Campomanes | E02F 9/2858 |

FOREIGN PATENT DOCUMENTS

| | | |
|---|---|---|
| WO | 03080946 | 10/2003 |
| WO | 2011156834 A1 | 12/2011 |
| WO | 2014037780 | 3/2014 |
| WO | 2016135360 | 9/2016 |

\* cited by examiner

BOLT RETENTION ASSEMBLY FOR A WORK TOOL

TECHNICAL FIELD

The present disclosure relates to the field of machines that perform work on a material using work implements such as mining, construction and earth moving machines and the like. Specifically, the present disclosure relates to a bolt retention assembly used to attach wear member such as shrouds to a work tool and the like.

BACKGROUND

During normal use on machines such as mining, construction, and earthmoving machines and the like, work implements such as blades or buckets, etc. have edges that experience wear. It is not uncommon for these edges to be protected by various types of wear members. These wear members are intended to be sacrificial, protecting the edges of the blade so that the more expensive blade or other type of work implement does not need to be replaced. It is desirable that these wear members be replaced before damage or wear occurs on the working edges of the work implement.

Removal and/or replacement of a wear member may require disassembly of the wear members from the edge of the work tool, and assembly of a repaired or a new wear member on the work implement. The machine must be taken out of service to perform such replacement or repair. The time required to disassemble and reassemble a wear member may be dictated by the mechanism used to retain the wear member on the work tool. It is desirable to have a retention system or assembly that allows for quick assembly and disassembly at a worksite to allow the machine to be returned to service as quickly as possible.

U.S. Pat. No. 6,240,663 of Robinson, issued on Jun. 5, 2001 ("the '663 patent"), discloses a resilient connection system for attaching a wear member to an excavating lip structure. In particular, the '663 patent discloses a wear member that has a front portion with two rearwardly extending legs including an upper leg which is disposed on top of a lip of a bucket and a lower leg, which is disposed below the lip. The '663 patent further discloses that a connection member is welded to the bucket. The connection member includes an upstanding boss that includes a circular opening.

Likewise, the upper leg of the wear member of the '663 patent includes a projection. A fastener passing through the circular opening in the boss engages with the projection in the upper leg to attach the wear member to the connection member. The connection member of the '663 patent also includes two spring assemblies disposed on either side of the fastener. Each spring assembly includes a rod attached at one end to the connection member and a spring circumscribed around the rod. The spring is retained at the other end of the rod by a snap ring. The rods in each spring assembly of the '663 patent engage with openings in downwardly projecting bosses of the upper leg of the wear member so that the springs are retained between the bosses and the connection member. As the fastener is tightened, the spring assemblies of the '663 patent are compressed providing a biasing force to urge the wear member onto the lip. The '663 patent also discloses that a protective shroud is installed to protect the components of the retention system.

However, assembly of the retention system in the '633 patent may be complicated or cumbersome. Also, the amount of force used to retain the wear member to the work implement may be limited by the spring force provided in the retention system of the '633 patent. If this spring force is overcome, then the wear member may undesirably fall off the work implement.

SUMMARY OF THE DISCLOSURE

A bolt retention assembly according to an embodiment of the present disclosure defines a horizontal direction, a vertical direction, and a lateral direction that is perpendicular to the vertical direction and the horizontal direction. The bolt retention assembly may comprise an adapter including a forward abutment portion and a rearward horizontally oriented saddle portion. The adapter may also define an interior aperture. The bolt retention assembly may further comprise a slide including a forward threaded portion configured to fit within the interior aperture of the adapter, and a rearward vertically oriented cradle portion configured to receive the rearward horizontally oriented saddle portion of the adapter. The rearward horizontally oriented saddle portion defines a maximum horizontal dimension of the rearward horizontally oriented saddle portion, and the rearward vertically oriented cradle portion defines a maximum horizontal dimension of the rearward vertically oriented cradle portion that is equal to or greater than the maximum horizontal dimension of the rearward vertically oriented cradle portion such that the slide is free to move horizontally relative to the adapter A slide for use with a bolt retention assembly according to an embodiment of the present disclosure is provided. The slide may define a horizontal direction, a vertical direction, and a lateral direction that is perpendicular to the horizontal direction and the vertical direction. The slide may comprise a forward threaded portion, and a rearward vertically oriented cradle portion.

An adapter for use with a bolt retention assembly according to an embodiment of the present disclosure is provided. The adapter may define a horizontal direction, a vertical direction, and a lateral direction that is perpendicular to the horizontal direction and the vertical direction. The adapter may comprise a subassembly including a front adapter member comprising a forward abutment portion, and a rear adapter member comprising a rearward horizontally oriented saddle portion. The adapter may also define an interior aperture.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
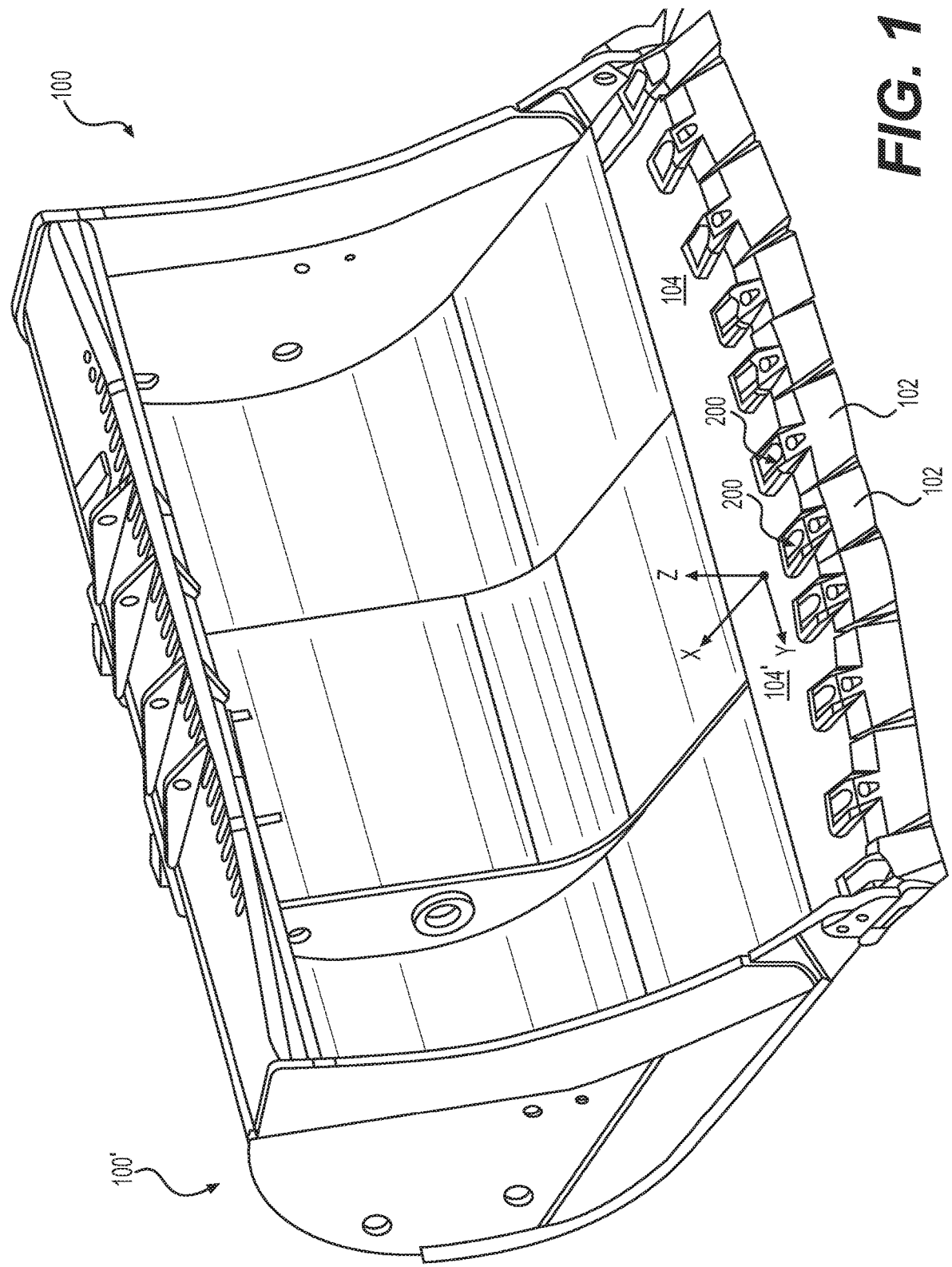
FIG. 1 is a perspective view of a work implement in the form of a bucket assembly that uses wear members (e.g. shrouds) that are attached to the lip of the bucket using a bolt retention assembly according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of a bolt retention assembly, a wear member such as a shroud, tool adapter, tool bit, tip, etc. that is configured to be attached to a working edge such as a lip of a work implement such as a bucket, a slide of a bolt retention assembly, and an adapter of a bolt retention assembly will now be described.

A bolt retention assembly 200 according to an embodiment of the present disclosure may be understood with reference to FIGS. 1-12. Looking at FIGS. 1 and 2, the bolt retention assembly 200 may define a horizontal direction (X direction), a vertical direction (Z direction), and a lateral direction (Y direction) that is perpendicular to the vertical direction (Z direction), and the horizontal direction (X direction). The bolt retention assembly 200 may be used to attach a wear member 102 such as a shroud to a work edge 104 of a work implement 100 (e.g. a lip 104' of a bucket assembly 100'). Other applications for attaching a wear member 102 are possible using the bolt retention assembly 200.

As shown in FIGS. 2 thru 5, the bolt retention assembly 200 may comprise an adapter 202 and a slide 204. The adapter 200 may include a forward abutment portion 206 and a rearward horizontally oriented saddle portion 208. The adapter 200 may also define an interior aperture 210. The slide 204 may include a forward threaded portion 212 configured to fit within the interior aperture 210 of the adapter 202 allowing the slide 204 to move back and forth within the interior aperture 210. The slide 204 may also include a rearward vertically oriented cradle portion 214 configured to receive the rearward horizontally oriented saddle portion 208 of the adapter 202. Thus, the adapter 202 and the slide 204 may be connected to each other while allowing the slide 204 the freedom of movement necessary to lock and unlock a wear member 102 onto the work edge 104 of the work implement 100 (see FIGS. 4 and 5 for examples of this movement). In particular embodiments, the interior aperture 210 may be configured as an elongated slot along the X direction to allow the slide 204 to move back and forth along the X direction.

With continued reference to FIGS. 2 thru 5, the adapter 202 may be split into a front adapter member 216 and a rear adapter member 218 configured to be attached to the front adapter member 216. This design may allow the bolt retention assembly 200 to be used with weld-on bosses which are already in the field on work implements. These weld-on bosses 216' may function as the front adapter member 216. In such a case, a clearance hole 220 may pass through the abutment portion 206 of the front adapter member 216 but it is to be understood that this clearance hole 220 may be omitted in various embodiments. In some embodiments, the adapter 202 may be manufactured from a unitary piece of material instead of being split.

When the adapter is a split assembly, the front adapter member 216 may include a vertically extending T-slot 222 and the rear adapter member 218 may include diametrically opposing hook portions 224 (may also be referred to as stem portions) configured to fit within the T-slot 222, being placed therein vertically (along the negative Z direction). Once assembled, the rear adapter member 218 cannot move in the positive X direction or the negative X direction since various portions of the rear adapter member 218 would contact the various portions of the front adapter member 216, which may already have been attached to the work edge 104 via welding, fastening, etc.

Figure 4:
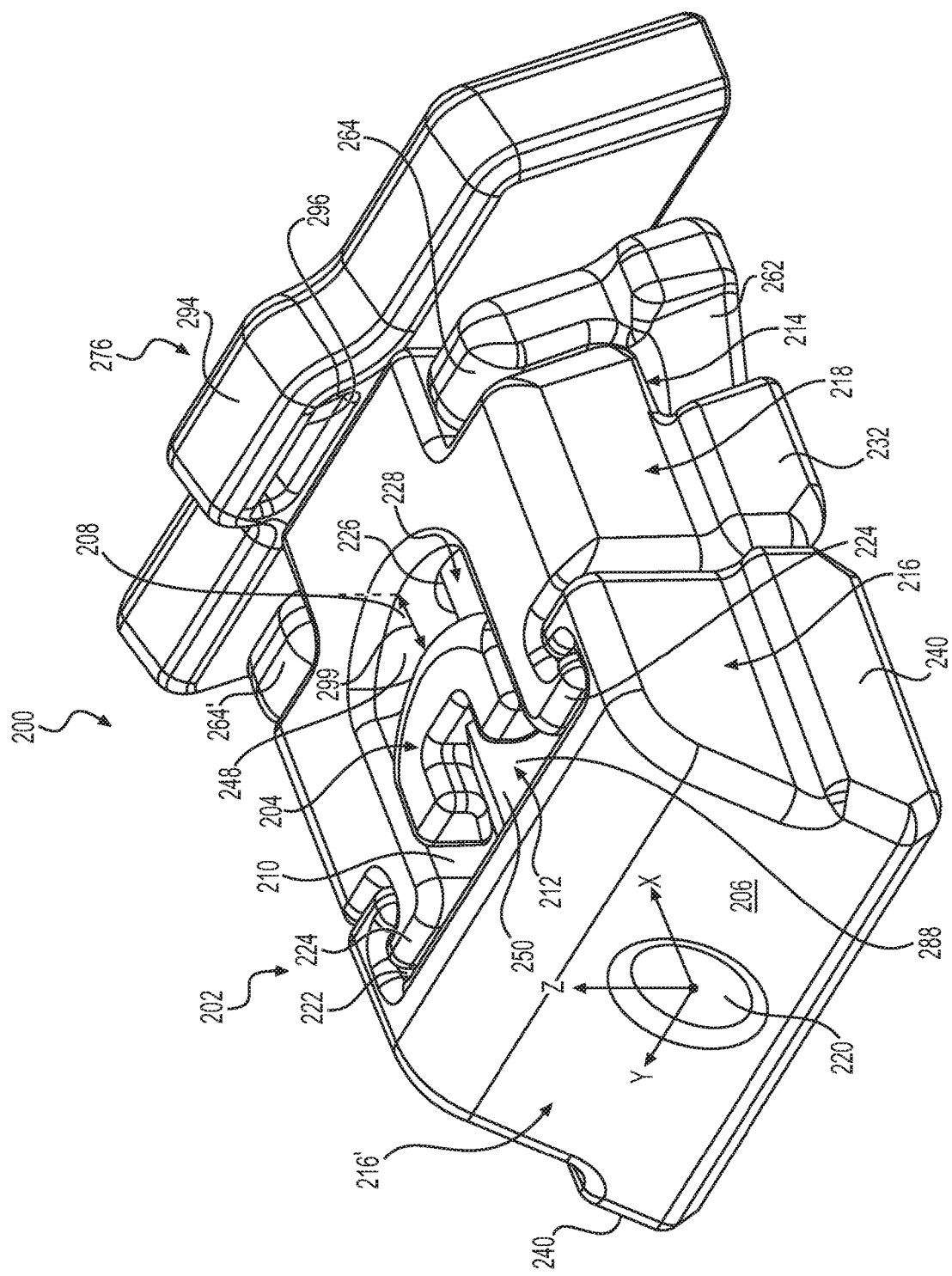
FIG. 4 illustrates the bolt retention assembly of FIG. 3 assembled with the slide in a forward position when the bolt has been loosened. The components shown may be provided as a kit or subassembly.
Figure 9:
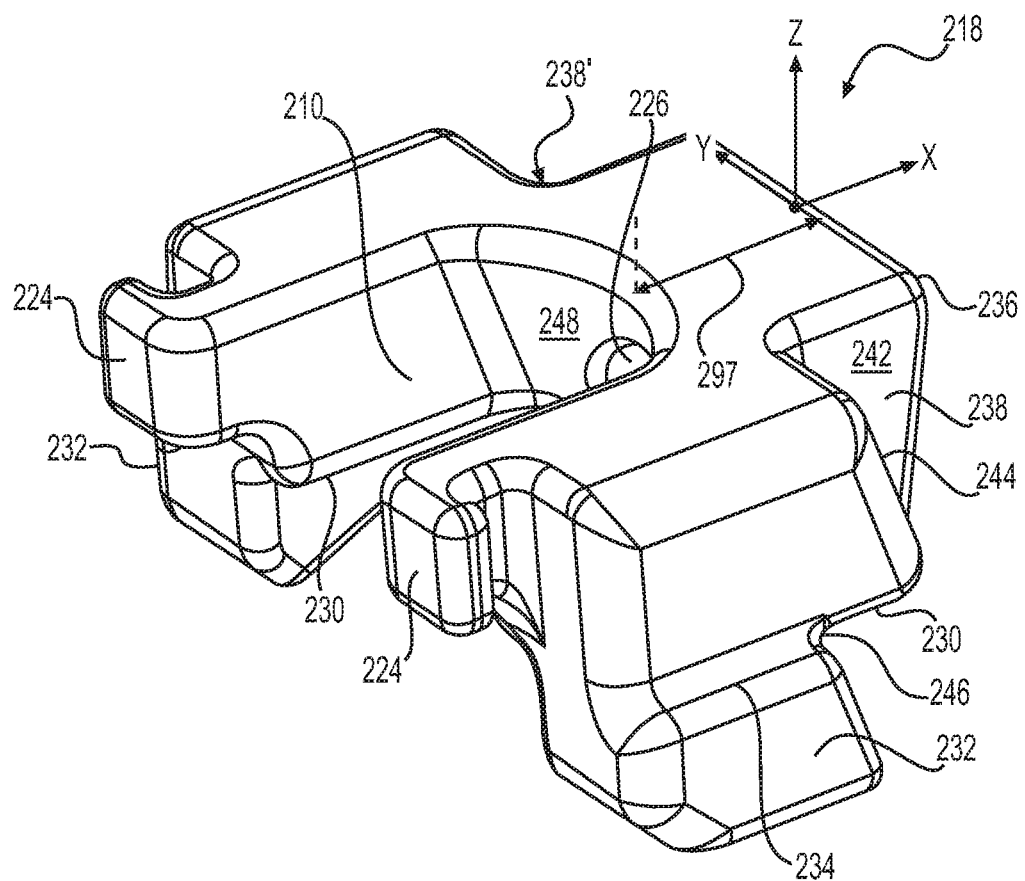
FIG. 9 is a front oriented perspective view of the rear adapter member of the bolt retention assembly of FIGS. 2 thru 4.
Figure 10:
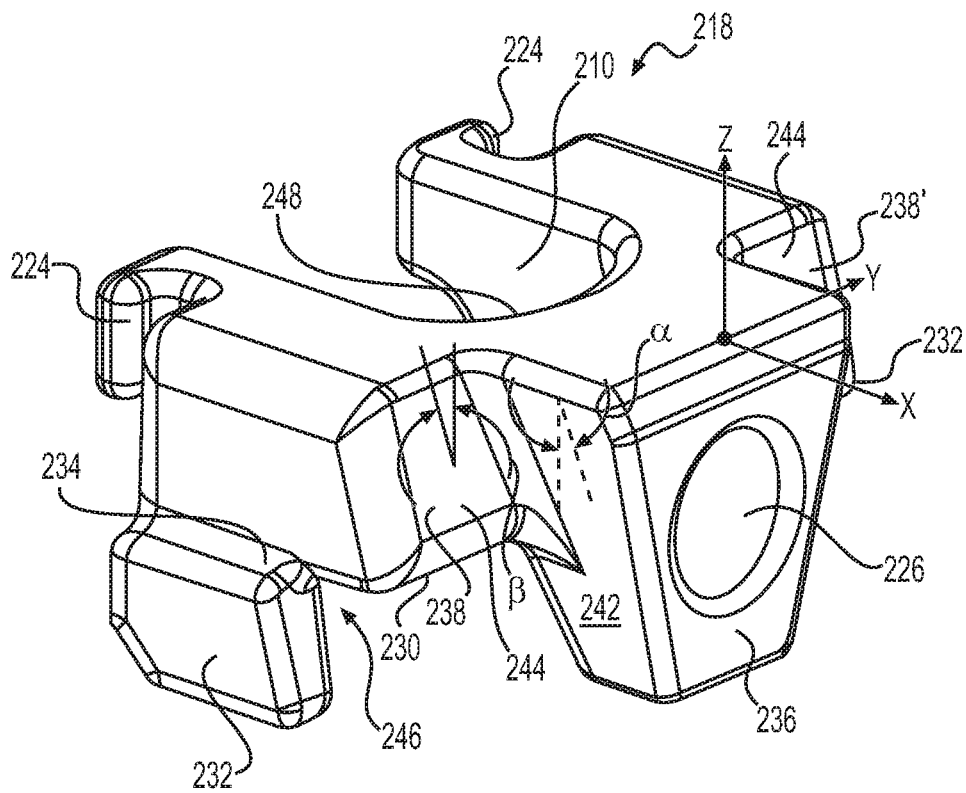
FIG. 10 is a rear oriented perspective view of the rear adapter member of the bolt retention assembly of FIGS. 2 thru 4.

Also, as best seen in FIGS. 4, 9, and 10, the rearward horizontally oriented saddle portion 208 of the rear adapter member 218 defines a horizontally extending thru-hole 226 that allows the bolt 228 to pass through the rearward horizontally oriented saddle portion 208 along the negative X direction and reach the forward threaded portion 212 of the slide 204 and mate therewith when attaching the bolt 228 to the assembly 200 or using the bolt 228 to tighten or loosen the assembly 200.

As best seen in FIGS. 9 and 10, the rearward horizontally oriented saddle portion 208 of the rear adapter member 218 may define a downward vertically (along the negative Z direction) facing ledge 230 disposed in the interior aperture 210. Furthermore, the rear adapter member 218 may include a rail 232 extending laterally outwardly (negative Y direction on one side and positive Y direction on the other side) from the rearwardly horizontally oriented saddle portion 208 defining a top surface 234 substantially coplanar with the ledge 230 (e.g. within a distance vertically measured of +/−2 mm).

Likewise, the horizontally oriented saddle portion 208 of the rear adapter member 218 may include a horizontally extending projection 236 and may define a first notch 238 disposed laterally on one side (negative Y direction) of the horizontally extending projection 236, and a second notch 238' (positive Y direction) disposed laterally on the other side of the horizontally projection 236. The front adapter member 216 may include a rail 240 extending laterally outwardly from the front adapter member 218 that is coextensive with the rail 232 of the rear adapter member 218 (see FIGS. 4 and 5).

Other features that may be present or omitted from the rear adapter member 218 will now be further discussed with reference to FIGS. 9 and 10. The horizontally extending projection 236 may include lateral surfaces 242 that partially define the notches 238, 238' that are inclined or drafted relative to the negative Z direction forming an angle α (see FIG. 10) measured in a plane parallel to the Y-Z plane such that they may readily engage and disengage portions of the slide 204 as will be discussed herein momentarily. Angle α may range from 10 degrees to 20 degrees in various embodiments and may be approximately 17 degrees in certain embodiments.

In addition, the rear surfaces 244 that partially define the notches 238, 238' may be inclined forming an angle β relative to the positive Z direction measured in a plane parallel to the X-Z plane allowing these rear surfaces 244 to match the corresponding surfaces of portions of the slide 204 as will be discussed in more detail momentarily. The rear adapter member 218 may also further define horizontally extending slots 246 configured to allow portions of the slide 204 to slide horizontally under the rear adapter member 218 along the positive and negative X directions in close proximity to the ledge 230. The rear adapter member 218 may also include a concave arcuate surface 248 that is configured to allow the corresponding portion of the slide 204 to contact or nearly contact this concave arcuate surface 248 (see FIG. 5). The rear adapter member 218 may be symmetrical about the X-Z plane. Angle β may range from 10 degrees to 20 degrees in various embodiments and may be approximately 17 degrees in certain embodiments.

Looking at FIGS. 2 thru 5, 11 and 12, the slide 204 will be further discussed. The slide 204 may include a forward threaded portion 212 when the nut 250 is provided and attached to a front horizontally oriented cradle portion 252. More specifically, the nut 250 configured to fit in the front horizontally oriented cradle portion 252 to form the forward threaded portion 212 and be retained therein via a slight press fit, welding, adhesives, etc. In other embodiments, the forward threaded portion may include a threaded pocket that is unitary with the slide 204, etc.

Figure 11:
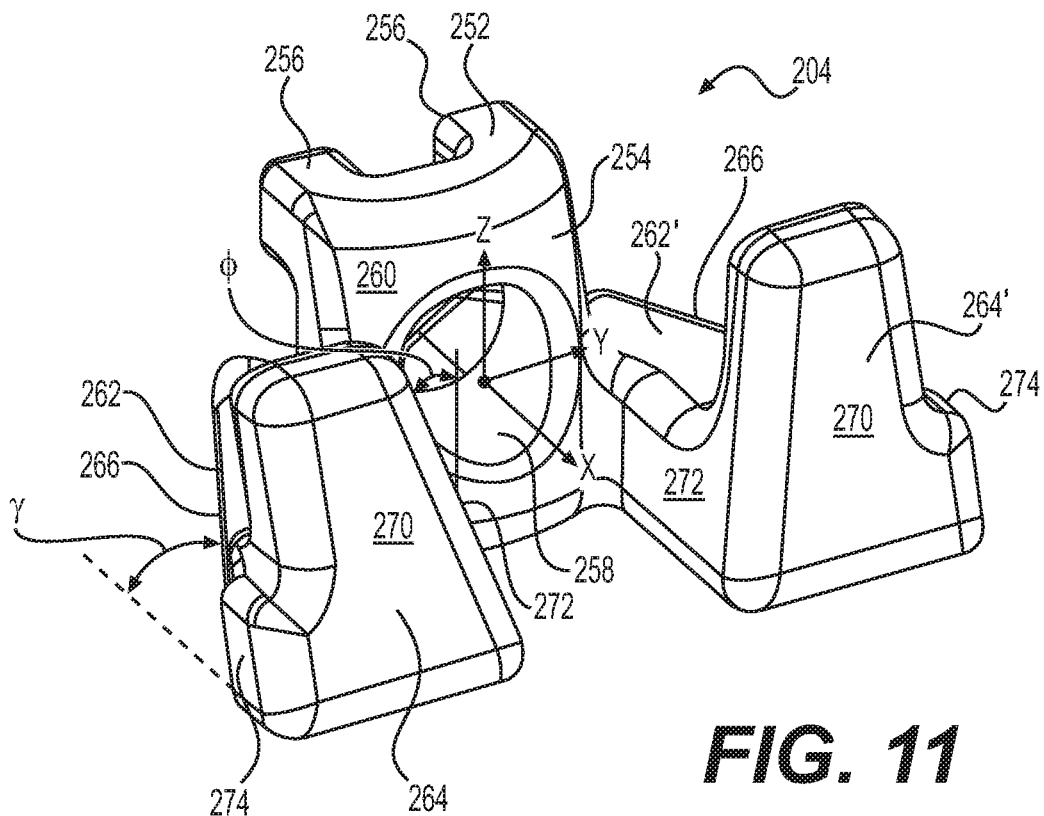
FIG. 11 is a rear oriented perspective view of the slide of the retention assembly of FIGS. 2 thru 4.
Figure 12:
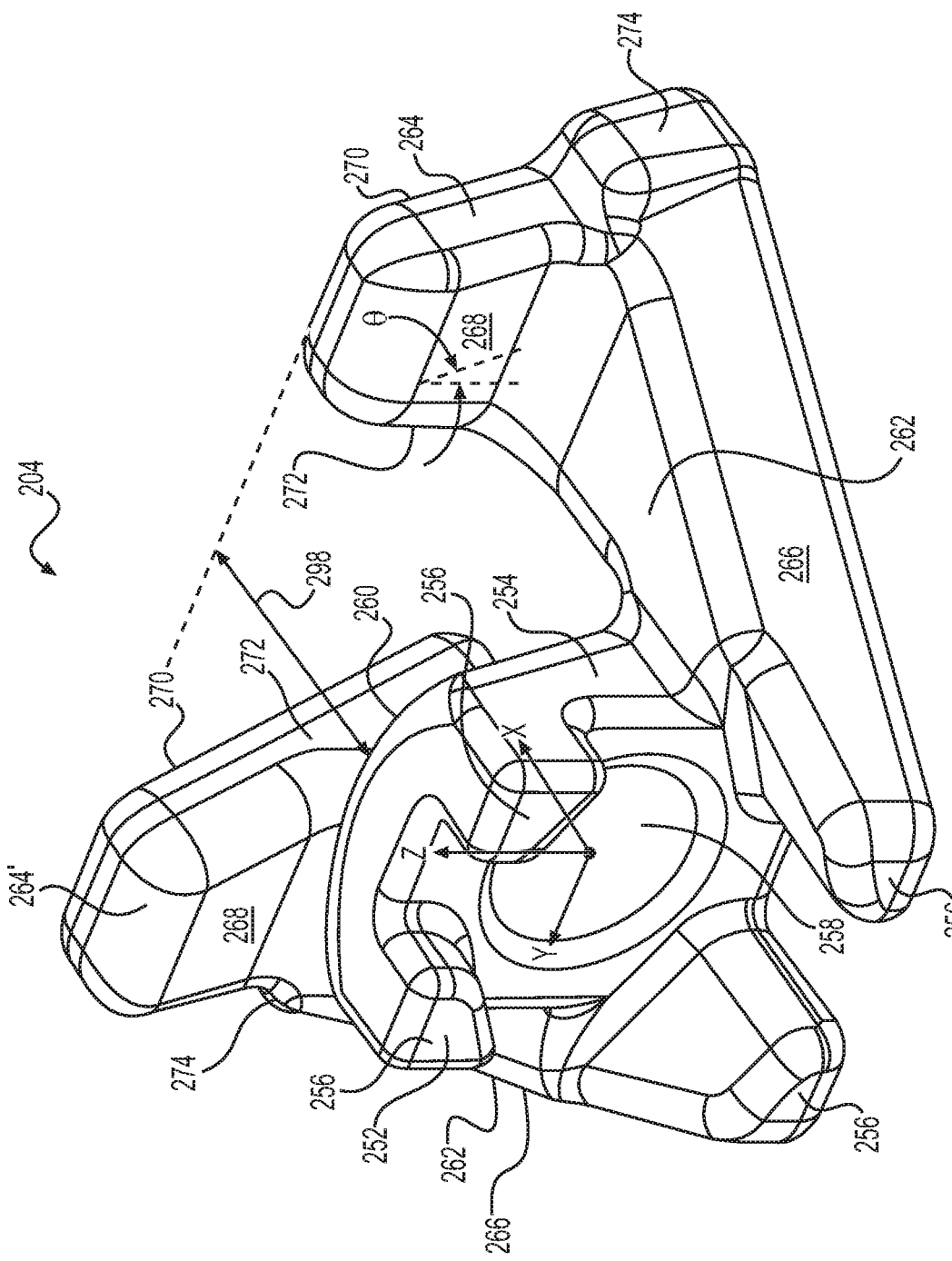
FIG. 12 is a front oriented perspective view of the slide of the retention assembly of FIGS. 2 thru 4.

Focusing on FIGS. 11 and 12, the front horizontally oriented cradle portion may include a vertical wall 254 for supporting the nut 250 in the horizontal (positive X direction) and four horizontally extending (negative X direction) prongs 256 attached to the vertical wall 254 for surrounding the nut 250 to prevent rotation of the nut 250 in use and holding the nut 250 vertically. Again, other constructions for this cradle 252 such as a pocket are possible in other embodiments. The vertical wall 254 may define a horizontally extending clearance hole 258 that extends completely through the vertical wall 254 that allows the bolt to pass 228 therethrough and engage the threaded nut 250 such as when the bolt 228 is being attached to the assembly 200 or is being used to loosen or tighten the assembly 200. The vertical wall 254 may also include a convex arcuate surface 260 that is configured to match the concave arcuate surface 248 of the rear adapter member 218.

The rearward vertically oriented cradle portion 214 may include two horizontal members 262 (e.g. a first horizontal member 262 and a second horizontal member 262') extending horizontally (substantially in the positive X direction) from the vertical wall 254 and two vertical members 264 extending vertically (e.g. a first vertical member 264 and a second vertical member 264' extending in substantially the positive Z direction) from the two horizontal members 262. These members 262, 254 may be spaced apart from each other in order to accommodate the horizontally extending projection 236 of the rear adapter member 218. In other embodiments, the rearward vertically oriented cradle portion 214 may include a continuous wall that extends laterally to form a slot. Other configurations are possible in other embodiments.

Other details of the slide 204 will now be discussed focusing on FIGS. 11 and 12 that also may be present or omitted in various embodiments of the present disclosure. The two horizontal members 262 may include lateral angled surfaces 266 that form an angle γ that provides draft along the X direction (see FIG. 11, measured in a plane parallel to the X-Y plane) as the slide 204 moves underneath the rear adapter member 218 in its horizontally extending slots 246. Angle γ may range from 10 degrees to 20 degrees in some embodiments and may be approximately 17 degrees in certain embodiments.

Similarly, the two vertical members 264 may include forward surfaces 268 and rear surfaces 270 that form draft angles Θ with the Z direction (see FIG. 12, measured in a plane parallel to the X-Z plane) that matches the draft angle β of the rear adapter member 218. Also, the two vertical members 264 may also include inside lateral surfaces 272 that form draft angles φ with the Z direction (see FIG. 11, measured in a plane parallel to the Y-Z plane) that match the draft angle α of the rear adapter member 218. The slide may also include rail portions 274 that are coextensive with the rails 232, 240 of the adapter 202 once the slide 204 mates with the adapter 202. The slide 204 may be symmetrical about the X-Z plane.

Figure 5:
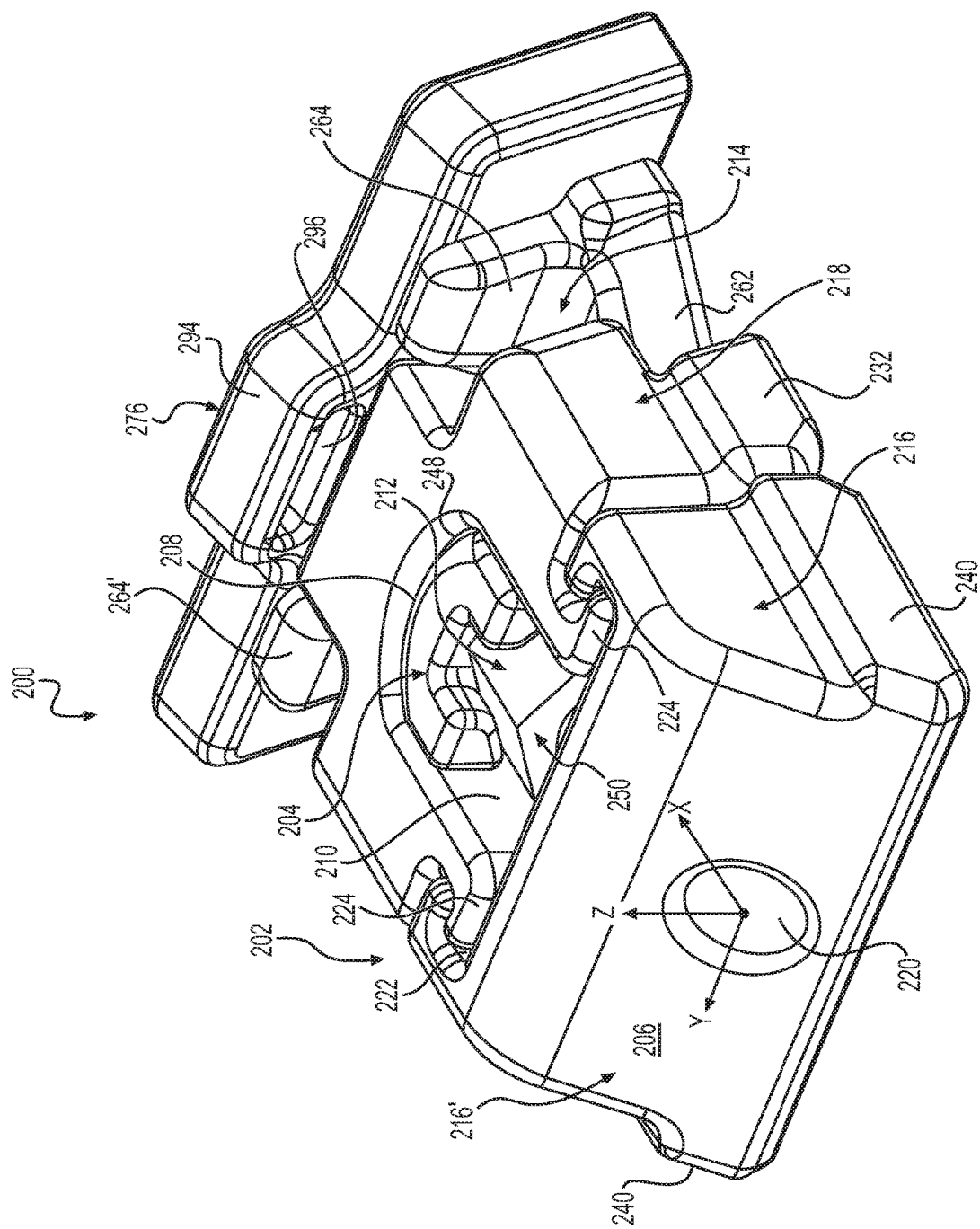
FIG. 5 illustrates the bolt retention assembly of FIG. 4 assembled with the slide in a rearward position when the bolt has been tightened.
Figure 7:
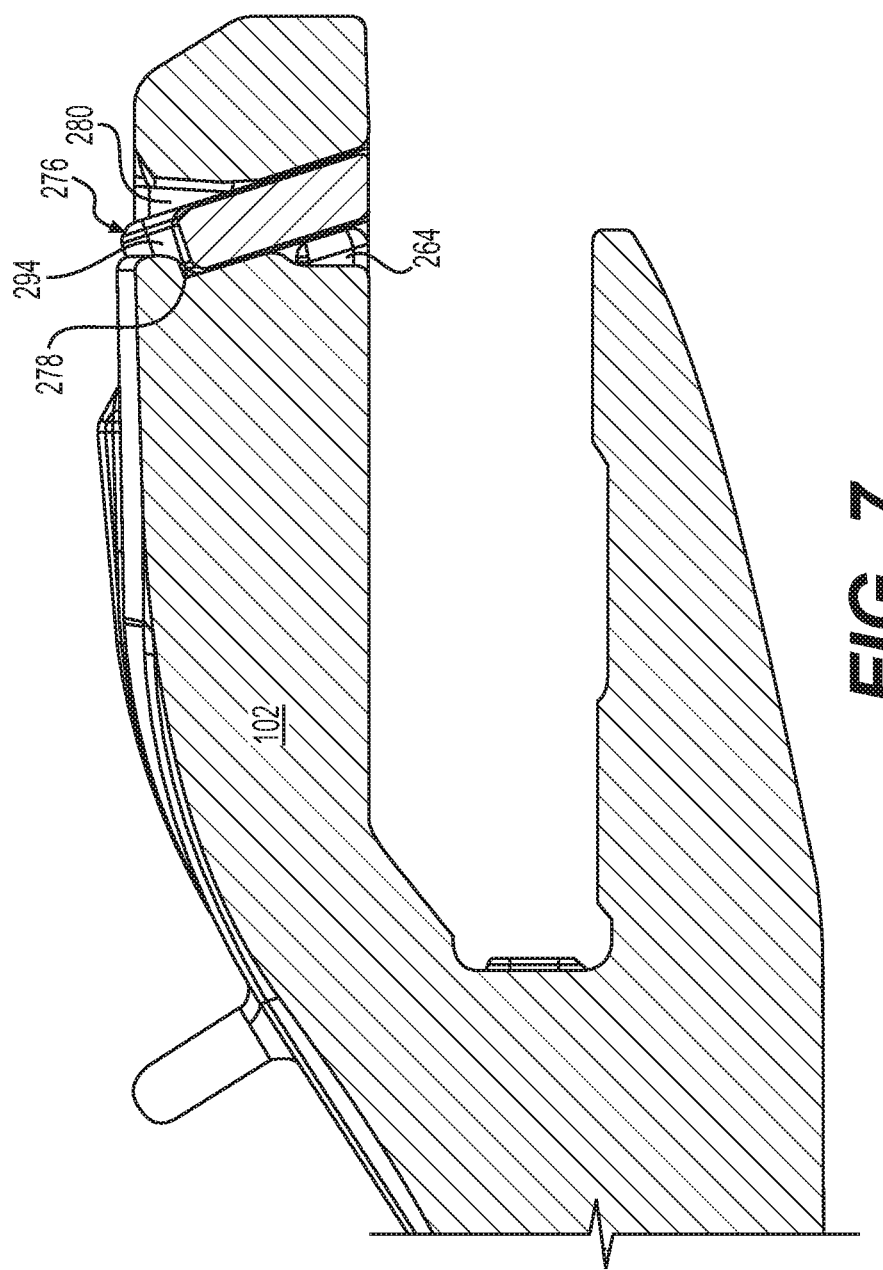
FIG. 7 is a partial sectional view of the bolt retention assembly of FIG. 6 after being tightened, causing the slide to contact the retainer plate and prevent removal of the retainer plate from the wear member.

When the two vertical members 264 engage the retainer plate 276 as best seen in FIGS. 5 and 7, the retainer plate 276 is trapped in a notch 278 in communication with the vertically extending slot 280 of the wear member 102, preventing the removal of the retainer plate 276 along the Z direction from the vertically extending slot 280. Thus, the retainer plate 276 now prevents removal of the wear member 102 along the X direction as the bolt retention assembly 200 blocks such a movement.

Figure 8:
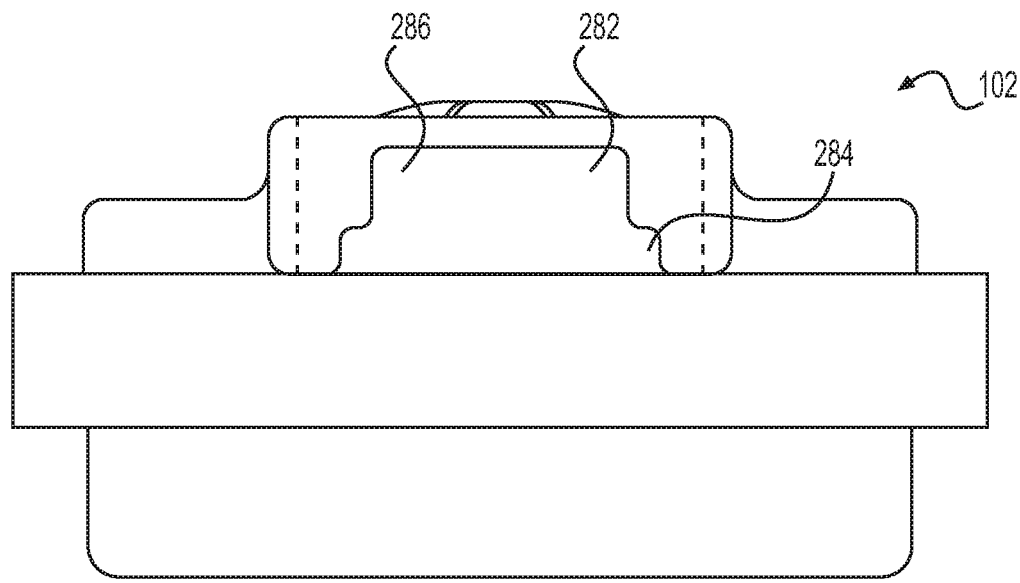
FIG. 8 is a rear view of the wear member of FIGS. 2 and 6 configured to receive the bolt retention assembly of FIGS. 2 thru 4.

Referring now to FIG. 8, the wear member 102 may define a horizontally extending slot 282 that that is configured to accommodate the components of the bolt retention assembly 200. More specifically, the horizontally extending slot 282 of the wear member 102 may exit out the rear of the wear member 102 and may include a keyway 284 that is configured to receive the rails 232, 240, 274 of the various components of the bolt retention assembly 200 to guide the insertion of these components as the wear member 102 is inserted horizontally onto the working edge 104 of the work implement 100 and over these components. The top portion 286 of the horizontally extending slot 282 is configured to receive the top portions of the components of the bolt retention assembly 200. Other configurations are possible in other embodiments.

Looking at FIGS. 2 thru 7 as already alluded to earlier herein, the bolt retention assembly 200 may further comprise a bolt 228 including a shaft 288 and a head 290, as well as a retainer plate 276 that includes a bolt head clearance hole 292 configured to allow the head 290 of the bolt 228 to pass through the retainer plate 276 during the assembly process. The retainer plate 276 may also include an upper tab 294 defining a slot 296 that may be engaged via a tool such as a pry bar to remove the retainer plate 276 prior to tightening the bolt 228 or after loosening the bolt 228 (see FIG. 6) since two vertical members 264 of the slide 204 are not yet locking the retainer plate 276 into an angled orientation where it is trapped in the notch 278 that is in communication with the vertically extending slot 280 of the wear member 102.

Figure 6:
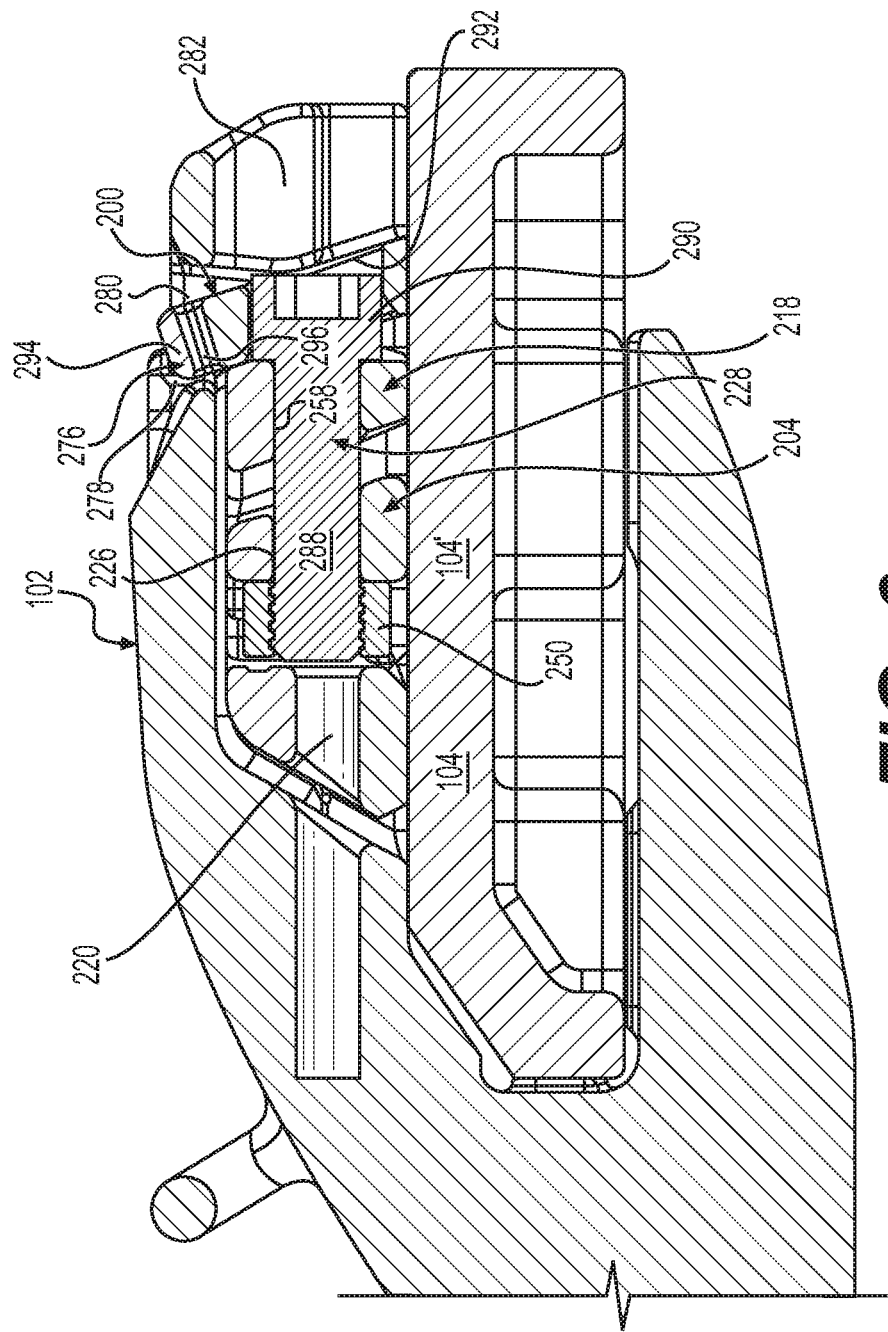
FIG. 6 is a sectional view of a wear member in the process of being locked onto the lip of a work implement using the bolt retention assembly of FIG. 5.

With continued reference to FIG. 6, the shaft 288 of the bolt 228 may pass through the bolt head clearance hole 292 of the retainer plate 276 and the clearance holes 226, 258 of the slide 204 and the rear adapter member 218 and engage the threads of the nut 250. The bolt head 290 may engage the rear adapter member 218 so that once the shaft 288 of the bolt 228 is threaded into the nut 250, the horizontal position of the bolt 228 is substantially fixed and cannot be removed from the assembly 200 without unthreading the bolt 228 from the nut 250. As the bolt 228 is tightened, the bolt head 290 presses on the rear adapter member 218, which in turn, presses onto the front adapter member 216 that is fixed to the working edge 104 of the work implement 100. At the same time, the nut 250 is drawn toward the bolt head 290, forcing the slide 204 along the horizontal direction (positive X direction) until the retainer plate 276 is trapped in the notch 278.

Put another way, the bolt retention assembly 200 may be configured such that tightening the bolt 228 causes the slide 204 to move away from the adapter 202 and engage the retainer plate 276 while the bolt 228 is placed under tension and the adapter 202 is placed under compression. To that end, the rearward horizontally oriented saddle portion 208 defines a maximum horizontal dimension 297 of the rearward horizontally oriented saddle portion 208 (shown in FIG. 9), while the rearward vertically oriented cradle portion 214 defines a maximum horizontal dimension 298 of the rearward vertically oriented cradle portion 214 (shown in FIG. 12) that is equal to or greater than the maximum horizontal dimension 297 of the rearward vertically oriented cradle portion 214 such that the slide 204 is free to move horizontally relative to the adapter 202 and press on the retainer plate 276. This difference creates a travel distance 299 of the slide 204 as may be seen in FIG. 4.

In FIG. 6, it can also be seen that bolt head clearance hole 292 of the retainer plate 276 is angled so that the bolt head 290 may only pass through the retainer plate 276 if the retainer plate 276 is angled forward as shown into the notch 278. That is to say, the longitudinal axis of the bolt head clearance hole forms an oblique angle with the thickness (minimum dimension) of the retainer plate 276. Other configurations are possible in other embodiments.

Any of the surfaces or features described herein may have any suitable shape including flat, arcuate, etc. The term "arcuate" includes any bowed shape including polynomial, sinusoidal, spline, radial, elliptical, etc. Similarly, any blend or transitional surface may include any of these arcuate shapes or may be flat, etc.

Furthermore, as used herein, the terms "upper", "lower", "top", "bottom", "rear", "rearward", "forward", "forwardly", front, horizontal, vertical, lateral, etc. are to be interpreted relative to the direction of assembly of the component onto a front lip of a bucket assembly or the like but also includes functional equivalents when the components are used in other scenarios. In such cases, these terms including "upper" may be interpreted as "first" and "lower" as "second", etc. Reference to a Cartesian coordinate system will also be made. Such coordinate systems inherently define an X-axis, Y-axis, and Z-axis as well as corresponding X-Y, X-Z, and Y-Z planes. The X-axis may be coextensive with the horizontal direction, the Y-axis may be coextensive with the lateral direction, and the Z-axis may be coextensive with the vertical direction. Again, this coordinate system may be interpreted relative to the direction of assembly with the X direction being aligned with the direction of assembly such that horizontal, vertical and lateral directions are not necessarily to be interpreted strictly literally but to be adapted to the application. Furthermore, any direction such as horizontal, vertical, and lateral are intended to include directions that form an angle with that direction that is less than 45 degrees.

The configuration of any embodiment of a work implement, wear member, bolt retention assembly or any of its components may be varied to be different than what has been specifically discussed herein or shown in the drawings (e.g. the angles and dimension may be varied as needed or desired in various embodiments). The various components of the bolt retention assembly may be manufactured from steel.

INDUSTRIAL APPLICABILITY

In practice, a work implement such as a bucket assembly may be sold with one or more wear members, bolt retention assemblies, or any of the components of the bolt retention assembly according to any of the embodiments discussed herein. In other situations, a kit that includes components for retrofitting an existing work implement or a newly bought work implement with one or more wear members, bolt retention assemblies, or any of the components of the bolt retention assembly according to any of the embodiments discussed herein may be provided.

Figure 2:
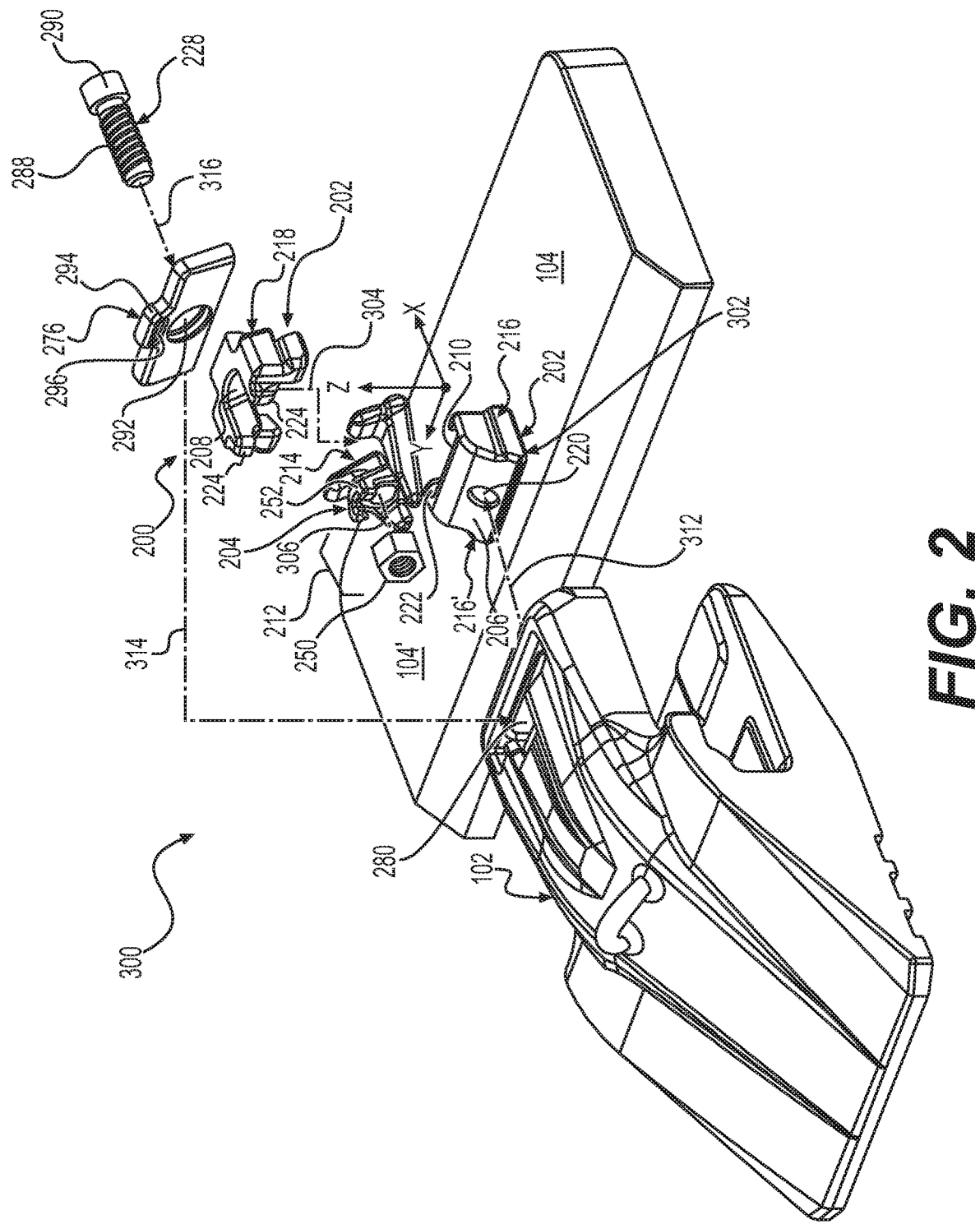
FIG. 2 is an exploded assembly view of a bolt retention assembly according to an embodiment of the present disclosure used to attach a wear member (e.g. a shroud) to the lip of the bucket assembly of FIG. 1.

A method 300 of attaching a wear member 102 to a work implement 100 using a bolt retention assembly 200 will now be discussed with reference to FIGS. 2 and 3. First, the front adapter member may be attached to the working edge of the work implement via welding or the like (step 302, see FIG. 2). Then, the rear adapter member may installed over the slide member such that its horizontally extending saddle portion of the rear adapter is seated in the vertically oriented cradle of the slide (step 304, see FIGS. 2 and 3). Next, the nut may be seated in to the forward horizontally extending cradle portion of the slide (step 306, see FIGS. 2 and 3). The order of these two steps may be reversed. Once these steps are complete, a subassembly is created (step 308, such as shown in FIG. 3).

Figure 3:
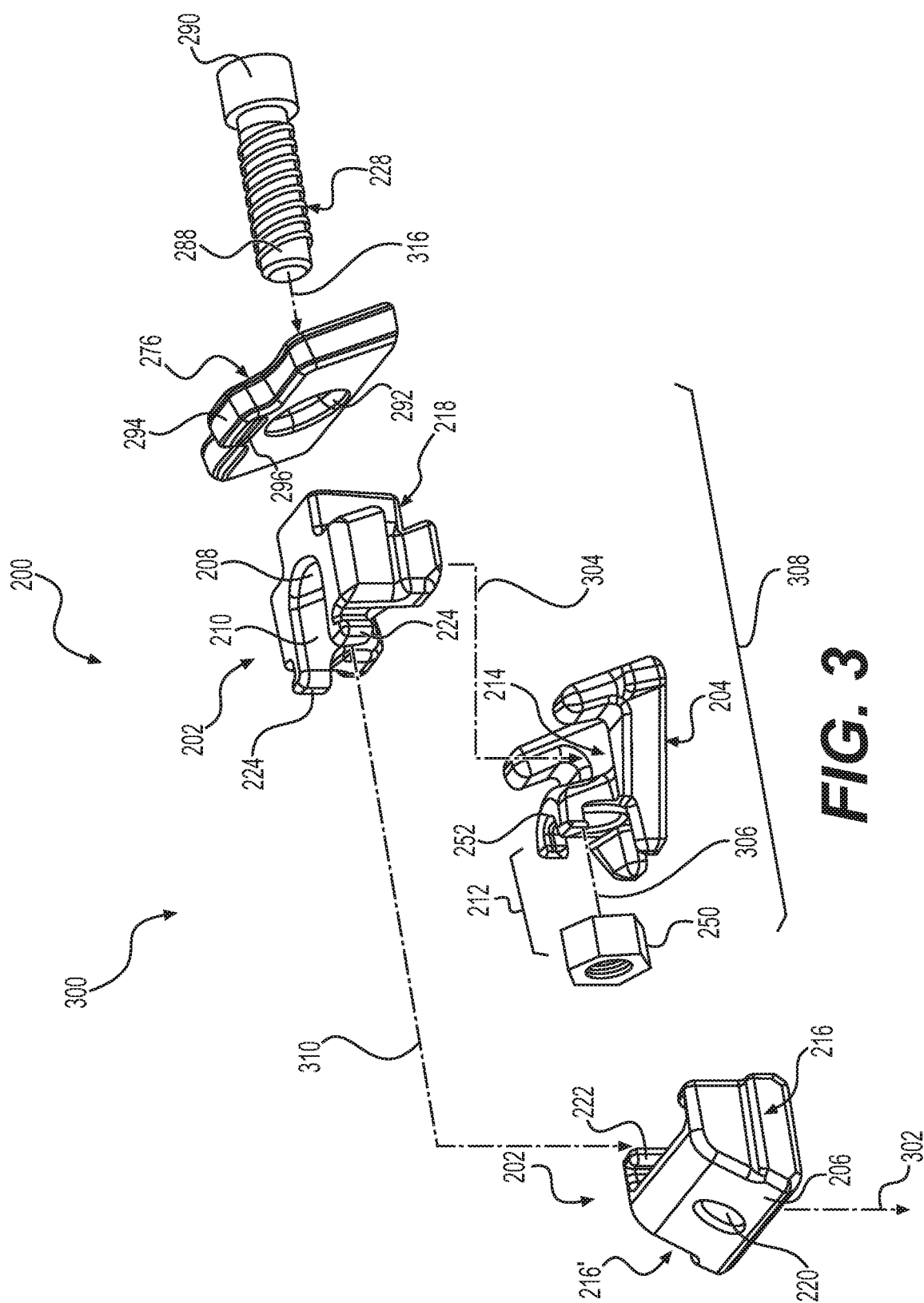
FIG. 3 is an exploded assembly view of the bolt retention assembly of FIG. 2 shown in isolation from the bucket assembly and wear member for enhanced clarity.

This subassembly may then be attached to the working edge of the work implement by mating the rear adapter member to the front adapter member vertically inserting the hook portions of the rear adapter member into the T-slot of the front adapter member (step 310 in FIG. 3). Next, the wear member is inserted horizontally (positive X direction) over the working edge of the work implement such that the bolt retention assembly is inserted into the horizontally extending slot of the wear member (step 312 in FIG. 2). After that, the retainer plate may be inserted into the vertically extending slot such that its bolt head clearance hole is aligned with the clearance holes of the rear adapter member and the slide (step 314 in FIG. 2). The bolt may then be inserted through these holes and threaded into the nut (step 316 in FIGS. 2 and 3). Continued tightening of the bolt causes the slide to move backwards as the nut is drawn toward the bolt head. This in turn causes the two vertical members of the slide to contact and trap the retainer plate in the notch that is in communication with the vertically extending slot of the wear member. Removal of the wear member is now prevented.

This process may be reversed to remove the wear member. After the bolt has been loosened and the slide has retreated sufficiently, the wear plate may be pushed into a vertical orientation so that is no longer trapped in the notch and may be removed from the wear member. The wear member may then be pushed horizontally (negative X direction) off the working edge of the work implement.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. Also, the numbers recited are also part of the range.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps or combined. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A bolt retention assembly defining a horizontal direction, a vertical direction, and a lateral direction that is perpendicular to the vertical direction and the horizontal direction, the bolt retention assembly comprising:
   an adapter including a forward abutment portion and a rearward horizontally oriented saddle portion that are fixed horizontally with respect to each other, the adapter also defining an interior aperture; and
   a slide including a forward threaded portion configured to fit within the interior aperture of the adapter, and a rearward vertically oriented cradle portion configured to receive the rearward horizontally oriented saddle portion of the adapter;
   wherein the rearward horizontally oriented saddle portion defines a maximum horizontal dimension of the rearward horizontally oriented saddle portion, and the rearward vertically oriented cradle portion defines a maximum horizontal dimension of the rearward vertically oriented cradle portion that is equal to or greater than the maximum horizontal dimension of the rearward horizontally oriented saddle portion such that the slide is free to move horizontally relative to the adapter.

2. The bolt retention assembly of claim 1, wherein the adapter is split into a front adapter member and a rear adapter member configured to be attached to the front adapter member.

3. The bolt retention assembly of claim 2, wherein the front adapter member includes a vertically extending T-slot and the rear adapter member includes diametrically opposing hook portions configured to fit within the T-slot.

4. The bolt retention assembly of claim 1, wherein the forward threaded portion includes a front horizontally oriented cradle portion and a nut configured to fit in the front horizontally oriented cradle portion to form the forward threaded portion.

5. The bolt retention assembly of claim 4, wherein the front horizontally oriented cradle portion includes a vertical wall and four horizontally extending prongs attached to the vertical wall.

6. The bolt retention assembly of claim 5, wherein the vertical wall defines a horizontally extending clearance hole that extends completely through the vertical wall.

7. The bolt retention assembly of claim 6, wherein the rearward vertically oriented cradle portion includes a first horizontal member and a second horizontal member extending horizontally from the vertical wall and a first vertical member extending vertically from the first horizontal member and a second vertical member extending vertically from the second horizontal member with the first and the second horizontal members being spaced away from each other and the first and the second vertical members being spaced away from each other.

8. The bolt retention assembly of claim 3, wherein the rearward horizontally oriented saddle portion defines a horizontally extending thru-hole.

9. The bolt retention assembly of claim 8, wherein the rearward horizontally oriented saddle portion of the rear adapter member defines a downward vertically facing ledge disposed in the interior aperture, the rear adapter member includes a rail extending laterally outwardly from the rearwardly horizontally oriented saddle portion defining a top surface substantially coplanar with the ledge.

10. The bolt retention assembly of claim 9, wherein the horizontally oriented saddle portion of the rear adapter member includes a horizontally extending projection and defines a first notch disposed laterally on one side of the horizontally extending projection, and a second notch disposed laterally on the other side of the horizontally extending projection, and the front adapter member includes a rail extending laterally outwardly from the front adapter member that is coextensive with the rail of the rear adapter member.

11. The bolt retention assembly of claim 1, further comprising:
   a wear member defining a horizontally extending slot that is configured to receive the bolt retention assembly;
   a retainer plate; and
   a bolt;
   wherein the bolt retention assembly is configured such that tightening the bolt causes the slide to move away from the adapter and engage the retainer plate while the bolt is placed under tension and the adapter is placed under compression.

12. A slide for use with a bolt retention assembly, the slide defining a horizontal direction, a vertical direction, and a lateral direction that is perpendicular to the horizontal direction and the vertical direction, the slide comprising:
- a forward threaded portion, wherein the forward threaded portion includes a front horizontally oriented cradle portion and a nut configured to fit in the front horizontally oriented cradle portion to form the forward threaded portion; and
- a rearward vertically oriented cradle portion.

13. The slide of claim 12, wherein the front horizontally oriented cradle portion includes a vertical wall and four horizontally extending prongs attached to the vertical wall.

14. The slide of claim 13, wherein the vertical wall defines a horizontally extending clearance hole that extends completely through the vertical wall and two vertical members extending vertically from the two horizontal members.

15. An adapter for use with a bolt retention assembly, the adapter defining a horizontal direction, a vertical direction, and a lateral direction that is perpendicular to the horizontal direction and the vertical direction, the adapter comprising:
- a subassembly including
    - a front adapter member comprising a forward abutment portion, wherein the front adapter member includes a vertically extending T-slot and the rear adapter member includes diametrically opposing hook portions configured to fit within the T-slot; and
    - a rear adapter member comprising a rearward horizontally oriented saddle portion;
- wherein the adapter also defines an interior aperture and the front adapter member and the rear adapter member are fixed horizontally and laterally with respect to each other.

16. The adapter of claim 15, wherein the rearward horizontally oriented saddle portion defines a horizontally extending thru-hole, and the interior aperture is empty.

17. The adapter of claim 16, wherein the rearward horizontally oriented saddle portion of the rear adapter member defines a downward vertically facing ledge disposed in the interior aperture, the rear adapter member includes a rail extending laterally outwardly from the rearwardly horizontally oriented saddle portion defining a top surface substantially coplanar with the ledge.

18. The adapter of claim 17, wherein the horizontally oriented saddle portion of the rear adapter member includes a horizontally extending projection and defines a first notch disposed laterally on one side of the horizontally extending projection, and a second notch disposed laterally on the other side of the horizontally extending projection, and the front adapter member includes a rail extending laterally outwardly from the front adapter member that is coextensive with the rail of the rear adapter member.

* * * * *